United States Patent
Poli et al.

(10) Patent No.: US 8,374,085 B2
(45) Date of Patent: Feb. 12, 2013

(54) METHOD AND APPARATUS FOR ACHIEVING BROADBAND MATCHING OF NARROW-BAND RESONATOR FILTER IMPEDANCES TO LOADS AND SOURCES

(75) Inventors: Christopher Poli, Doylestown, PA (US); Richard S. Grzeczkowski, Warrington, PA (US); Steven A. Didomenico, Mount Laurel, NJ (US); Christopher J. Stone, Newtown, PA (US); Leonard G. Filomeo, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 179 days.

(21) Appl. No.: 13/027,934

(22) Filed: Feb. 15, 2011

(65) Prior Publication Data
US 2011/0138435 A1 Jun. 9, 2011

Related U.S. Application Data

(63) Continuation of application No. 10/991,023, filed on Nov. 17, 2004, now Pat. No. 7,911,946.

(60) Provisional application No. 60/520,623, filed on Nov. 17, 2003.

(51) Int. Cl.
*G08C 15/00* (2006.01)

(52) U.S. Cl. .......... 370/230; 370/409; 348/180; 348/38; 709/238

(58) Field of Classification Search .......... 348/38, 348/180; 370/230, 395.53, 409; 709/224, 709/238
See application file for complete search history.

(56) References Cited

U.S. PATENT DOCUMENTS

| | | | |
|---|---|---|---|
| 5,953,505 A * | 9/1999 | Chida | 709/228 |
| 6,286,052 B1 | 9/2001 | McCloghrie et al. | |
| 6,320,875 B2 | 11/2001 | Katseff et al. | |
| 6,553,568 B1 | 4/2003 | Fijolek et al. | |
| 6,570,926 B1 | 5/2003 | Agrawal et al. | |
| 6,892,237 B1 | 5/2005 | Gai et al. | |
| 7,068,597 B1 | 6/2006 | Fijolek et al. | |
| 7,080,157 B2 | 7/2006 | McCanne | |
| 7,305,696 B2 * | 12/2007 | Thomas et al. | 725/114 |
| 7,516,198 B1 * | 4/2009 | Appala et al. | 709/219 |
| 2002/0015093 A1 | 2/2002 | Dureau et al. | |
| 2002/0048275 A1 | 4/2002 | Atwater et al. | |
| 2002/0158969 A1 | 10/2002 | Gupta | |

(Continued)

OTHER PUBLICATIONS

"DOCSIS Set-Top Gateway (DSG) Interface Specification", CM-SP-DSG-I02-040804, Cable Television Laboratories, Aug. 4, 2004, 2-pg. cover sheet, 2-pg. table of contents, 71 pages.

*Primary Examiner* — Kwang B Yao
*Assistant Examiner* — Nguyen Ngo
(74) *Attorney, Agent, or Firm* — Thomas A. Ward

(57) ABSTRACT

A method (400) for managing a data stream (30) encoded according to a digital transmission protocol and configured for broadcasting to a consumer network device (14) within a broadband communications network (10). A message relating to the data stream is encapsulated (402) within a transport layer data packet (502). The packet has a destination port number field. A value associated with a predetermined parameter of the digital transmission protocol is created (404) within the field. Based on the value, the packet is forwarded (406) to the consumer network device according to a network layer protocol. When the forwarded message is received by the consumer network device, the consumer network device processes the data stream based on the message, and establishes an application layer communication socket based on the destination port number value. The socket is usable to receive further messages associated with the predetermined parameter of the digital transmission protocol.

9 Claims, 5 Drawing Sheets

U.S. PATENT DOCUMENTS

| | | |
|---|---|---|
| 2003/0074445 A1 | 4/2003 | Roach et al. |
| 2004/0162980 A1* | 8/2004 | Lesenne et al. ............... 713/153 |
| 2004/0210667 A1* | 10/2004 | Fukasawa et al. ............ 709/231 |
| 2004/0257931 A1* | 12/2004 | Kudou et al. ................. 369/47.1 |
| 2006/0120369 A1* | 6/2006 | Chandran et al. ............. 370/390 |
| 2008/0056278 A1 | 3/2008 | Kadambi et al. |

* cited by examiner

METHOD AND APPARATUS FOR ACHIEVING BROADBAND MATCHING OF NARROW-BAND RESONATOR FILTER IMPEDANCES TO LOADS AND SOURCES

STATEMENT OF RELATED APPLICATIONS

This application claims the benefit of priority of U.S. Provisional Patent Application Ser. No. 60/520,623, filed Nov. 17, 2003, and is a continuation of U.S. Ser. No. 10/991,023, filed Nov. 17, 2004, both of which are incorporated herein in their entirety.

BACKGROUND

Program providers such as multiple system operators ("MSOs") deliver digital content and provide services to consumers over networks such as cable networks. Cable networks typically include headend reception and transmission equipment configured to distribute digital content/services to consumer network devices, such as set-top boxes, via encoded program streams carried over in-band channels.

In traditional cable networks, program streams are encoded using a combination of standard and proprietary protocols, and network interfaces are largely based on proprietary protocols. Moving Picture Experts Group ("MPEG") protocols are generally used to encode content into data streams. Each data stream has an associated program identifier ("PID") associated therewith, and multiple data streams are multiplexed into a single transport stream.

Information regarding the organization of the PIDs comprising the transport stream, is conventionally communicated to consumer network devices via service information messages transmitted on out-of-band ("OOB") channels. PID organization information is defined by well-known relational addressing tables (that are also associated with PIDs within the transport stream) such as the Program Association Table ("PAT") and Program Map Tables ("PMTs"). Other network-defined messages (often proprietary) are often delivered conventionally to consumer network devices on OOB channels. These message include service information messages that allow consumer network devices to efficiently decode MPEG's well-known relational addressing tables (for example, certain messages/tables defined by Motorola's DigiCipherll protocol), conditional access messages, electronic program guide messages, emergency alert system messages, and other generic messages. Many consumer network devices use hardware to filter messages received over OOB channels—for example, many set-top boxes manufactured by Motorola use hardware to filter messages relating to specific MPEG PIDs.

MSOs wish to create flexible network architectures—evidenced by the efforts of OpenCable™, a group of North American cable operators seeking to create a common platform for advanced interactive cable services—and prefer to rely on data communication technologies such as the Ethernet and Internet Protocol ("IP"), rather than an arrangement of proprietary network interfaces and protocols. The OpenCable™ effort has two key components: hardware specifications and software specifications. The hardware specifications define host devices (for example, set-top boxes) that include CableCARD™ modules/interfaces.

The software specifications, among other things, seek to standardize cable network interfaces. One such cable network interface is the interface for transporting messages over OOB channels between cable network headends and consumer network devices such as set-top boxes. The "DOCSIS® Set-top Gateway (DSG) Interface Specification," issued by CableLabs® on Aug. 4, 2004 (the "DSG Specification"), defines an interface for transport of OOB messages over Internet Protocol between a set-top network controller and a set-top box. The DSG Specification is hereby incorporated by reference in its entirety for all purposes, as if set forth in full herein.

In converged IP and Ethernet systems, however, MPEG PIDs are not unique, making infrastructure, such as hardware used by consumer network devices to filter OOB messages relating to specific MPEG PIDs, of little use. And although certain advanced set-top boxes may be able to receive OOB messages in the manner set forth in the DSG Specification, without the ability to filter the IP OOB messages using existing hardware, they may be overwhelmed by the task of processing the large number of IP OOB messages required to manage the encoded data streams received over in-band channels.

There are therefore needs for methods and apparatuses for managing encoded data streams configured for broadcasting to consumer network devices within broadband communication systems, which methods and apparatuses use packet-based network protocol messaging for out-of-band communication with the consumer network devices, and which also allow the consumer network devices to receive relevant messages based on predetermined parameters of the encoding protocol.

SUMMARY According to an aspect of the present invention, a method for managing a data stream encoded according to a digital transmission protocol and configured for broadcasting to a consumer network device within a broadband communications network includes: encapsulating a message relating to the data stream within a transport layer data packet, the transport layer data packet having a destination port number field associated therewith; creating a destination port number value within the destination port number field, the destination port number value associated with a predetermined parameter of the digital transmission protocol; and based on the destination port number value, forwarding the transport layer data packet to the consumer network device according to a network layer protocol. When the forwarded message is received by the consumer network device, the consumer network device is caused to process the data stream based on the message, and caused to establish an application layer communication socket based on the destination port number value. The application layer communication socket usable to receive further messages associated with the predetermined parameter of the digital transmission protocol.

The transport layer data packet, which may be a user data protocol ("UDP") packet, may be forwarded according to a protocol set forth in a document entitled "DOCSIS® Set-top Gateway (DSG) Interface Specification," issued by CableLabs® on Aug. 4, 2004. The network layer protocol may be an Internet Protocol "IP" protocol. The digital transmission protocol may be a Moving Pictures Experts Group ("MPEG") protocol.

The message, which may be an out-of-band message, includes information (such as a Program Association Table, a Program Map Table, a conditional access table, and an entitlement management message) used for accessing information within the data stream. The destination port number value (which may be in a predetermined private port range determined by a 3- or 4-bit prefix of the destination port number value) is a logical reference to the predetermined parameter (for example, an MPEG program identifier ("PID") value, a private unicast addressing protocol, or a private multicast addressing protocol), identifying the content of the message.

In accordance with another aspect of the present invention, a computer-readable medium is encoded with a computer program which, when loaded into a processor, implements the foregoing method.

In accordance with a further aspect of the present invention, a method for managing a data stream encoded according to a digital transmission protocol and configured for broadcasting to a consumer network device within a broadband communications network includes: receiving a message encapsulated within a transport layer data packet, the transport layer data packet having a destination port number field associated therewith, the destination port number field having a value therein associated with a predetermined parameter of the digital transmission protocol; based on the destination port number value, establishing an application layer communication socket, the application layer communication socket usable to receive further messages associated with the predetermined parameter of the digital transmission protocol; and based on the message, processing the data stream. The method may further include using hardware or software filters associated with the consumer network device to discriminate the destination port number field.

In accordance with a still further aspect of the present invention, a computer-readable medium is encoded with a computer program which, when loaded into a processor, implements the foregoing method.

In accordance with yet another aspect of the present invention, an apparatus for managing a data stream encoded according to a digital transmission protocol and configured for broadcasting to a consumer network device within a broadband communications network includes: an interface operative to process a plurality of transport layer data packets; a computer-readable storage medium; and a processor responsive to the computer-readable storage medium and to a computer program. When the computer program is loaded into the processor, it is operative to: arrange for receipt of a message encapsulated within a transport layer data packet, the transport layer data packet having a destination port number field associated therewith, the destination port number field having a value therein associated with a predetermined parameter of the digital transmission protocol; and based on the destination port number value, arrange for establishment of an application layer communication socket, the application layer communication socket usable to receive further messages associated with the predetermined parameter of the digital transmission protocol, the data stream arranged for processing based on the message.

The processor may be associated with a server, or with the consumer network device (which may be, for example, a set-top box).

DETAILED DESCRIPTION

Figure 1:
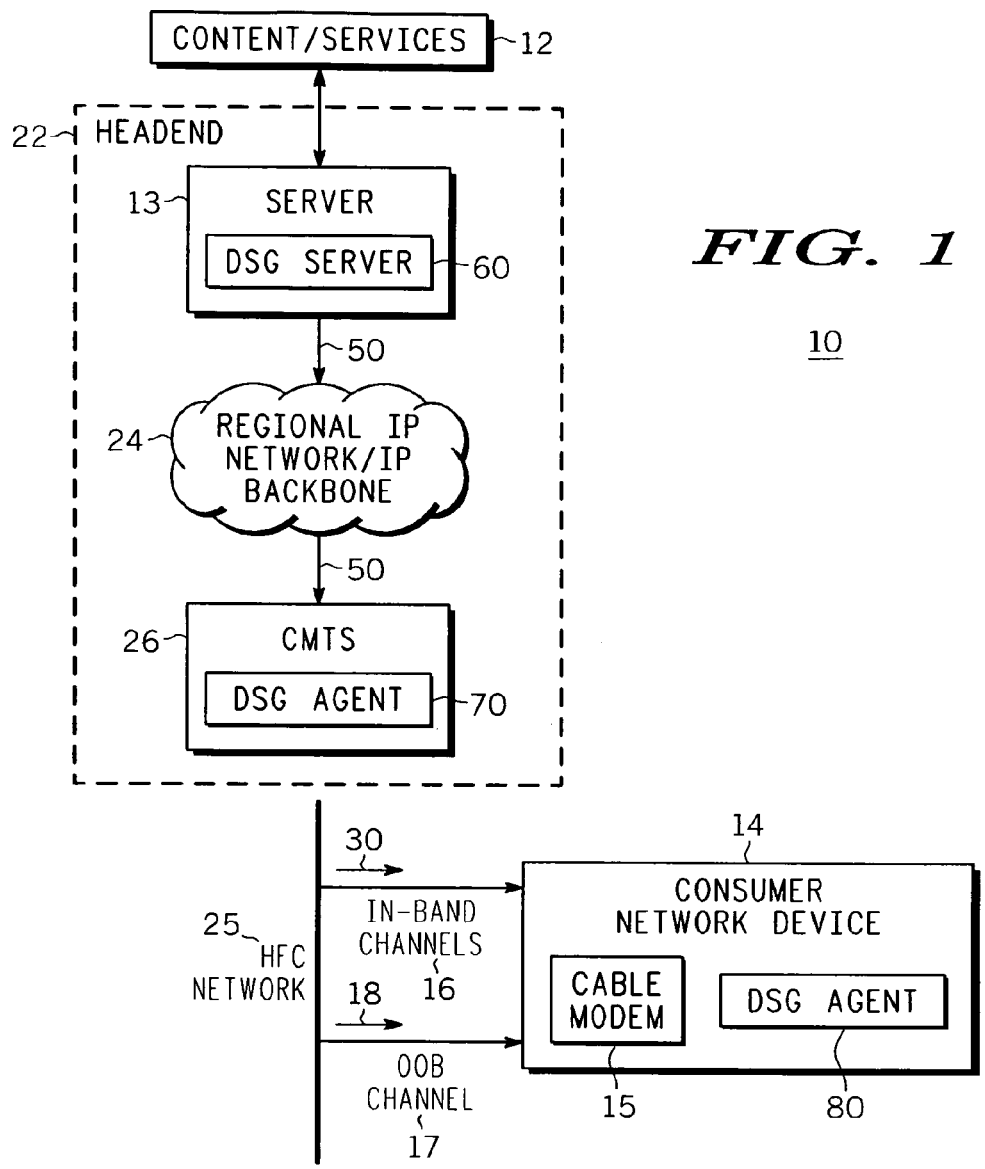
FIG. 1 is a block diagram of a broadband communication system, in which various aspects of the present invention may be used.

Turning now to the drawings, wherein like numerals designate like components,

FIG. 1 is a block diagram of a broadband communication system 10, in which various aspects of the present invention may be used. System 10 includes a number of network devices—a server 13, a cable modem termination system ("CMTS") 26, and a consumer network device 14. Server 13 and CMTS 26 are in communication via regional IP network/IP backbone 24 within a headend 22, and a consumer network device 14 having a cable modem 15 is responsive to headend 22 via a hybrid fiber-optic/coaxial cable ("HFC") network 25.

In general operation of system 10, headend 22 facilitates distribution of content 12 to computer network device 14 over HFC network 25. Content 12 includes any pre-recorded or live electronic signals, either analog or digital, representing an image and/or audio, software, or other data, in any format, and services including interactive television, Internet services, telephone services, video-on-demand services, and the like.

System 10 is preferably a cable system operated by a multiple system operator ("MSO") that implements aspects of the "DOCSIS® Set-top Gateway (DSG) Interface Specification," published by CableLabs® on Aug. 4, 2004 (the "DSG Specification," which is hereby incorporated by reference in its entirety for all purposes, as if set forth in full herein); and consumer network device 14 is a cable receiver (such as Motorola's DCT, CableCard and DVB Conditional access devices) that contain an embedded cable modem 15 for Data Over Cable Service Interface Specification ("DOCSIS®") connectivity and an embedded set-top box. DSG Server function 60 (discussed further below), DSG Agent function 70 (discussed further below), and DSG Client function 80 (also discussed further below) implement interface requirements (the "DSG Protocols", which are set forth in the DSG Specification) and/or functions referred to in the DSG Specification as the DSG Server, the DSG Agent, and the DSG Client, respectively, in their respective network devices 13, 26, and 14.

It will be understood, however, that system 10, and connections throughout, may be any public or private, wired or wireless, content transmission infrastructure or technology for delivery of content 12, including but not limited to a fiber-optic network, a coaxial cable network, a satellite network, a cellular network, a wireless network, the Internet, a television network, a radio network, a copper wire network, or any other existing or future transmission infrastructure or technology, or any combination thereof, operated by any type of program provider, such as a television network or station, a studio, an Internet broadcaster or service provider, a cable operator, or a satellite operator; and consumer network device 14 may be any device or combination of devices responsive to system 10, capable of receiving and rendering content 12 in accordance with aspects of the present invention, including but not limited to an OpenCable™ host device or component thereof (such as a CableCARD™ module), home- or office-based personal computer systems, gateways, receiving, recording or playback devices, stereo systems, personal computer/television devices, and other types of wired or wireless devices, such as personal digital assistants, radiofrequency communication devices, and any other type of network appliance, either standing alone or included in other devices.

In general, headend 22 facilitates delivery of content 12 to consumer network device 14 over HFC network 25—content 12 is transmitted as one or more data stream(s) 30 over in-band channel(s) 16. Data stream(s) 30 are encoded according to a digital transmission protocol such as a Moving Picture Experts Group ("MPEG") protocol (for example, MPEG2), and/or other protocols such as Motorola's DigiCipher II protocol.

More specifically, headend 22 manages consumer network device 14's access to content 12 via out-of-band ("OOB") Messages 50 (which may include, for example, conditional access messages, electronic program guide messages, emergency alert system messages, and service information messages) that are created by server 13 and received by consumer network device 14 as one or more packet streams 18 ("DSG Tunnels") over a dedicated OOB channel 17 in accordance with the DSG Protocols for multicasting OOB Messages 50. OOB channel 17 is a downstream channel that conforms to OOB channel specifications set forth in various DOCSIS® documents cited as normative references in the DSG Specification.

Headend 22 may also include additional reception and transmission equipment (not shown) that operates to perform the functions of headend 22.

Regional IP Network/IP Backbone 24, which includes components such as media gateways, signaling gateways, routers, switches and firewalls, may be included in, or separate from, headend 22.

Figure 2:
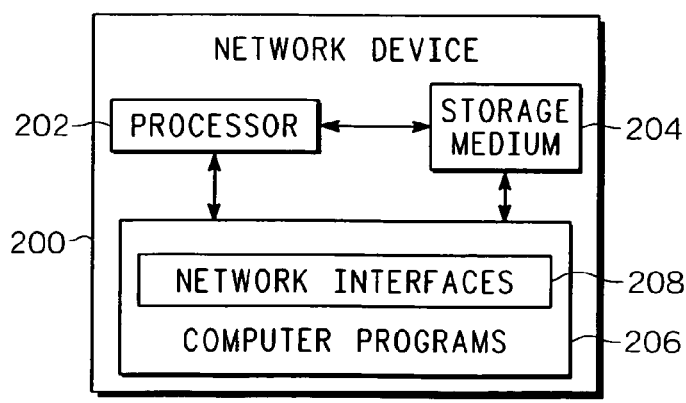
FIG. 2 is a block diagram of a generic network device having components that are included in the network devices shown in FIG. 1.

FIG. 2 is a block diagram of a generic network device 200 that has functional components generally included in, or accessible by, server 13 (discussed further below), CMTS 26 (discussed further below), and set-top box 14/cable modem 15 (also discussed further below). A processor 202 is responsive to computer-readable storage medium 204 and to computer programs 206. Computer-readable storage medium 204 may be any local or remote device, now known or later developed, capable of recording or storing data, and in particular may be, or may include, a read only memory ("ROM"), flash memory, random access memory, a hard disk drive, all types of compact disks and digital videodisks, and/or magnetic tape.

Computer programs 206 are generally software components implemented according to well-known software engineering practices for component-based software development and stored in computer-readable memories, such as storage medium 204. Computer programs 206, however, may be any signal processing methods and/or stored instructions, in one or more parts, that electronically control functions set forth herein.

Network Interface function 208 represents aspects of the functional arrangement of various computer programs 206 that pertain to the receipt and processing of OOB Messages 50 (shown in FIG. 1) as the OOB Messages traverse a downstream path of network devices (for example, server 13, CMTS 26 and consumer network device 14), passing through, at each network interface, the seven vertical layers of the well-known abstract model that defines internetworking: layer 1, the Physical Layer; layer 2, the Data Link Layer; layer 3, the Network Layer; layer 4, the Transport Layer; layer 5, the Session Layer; layer 6, the Presentation layer; and layer 7, the Application Layer. As such, Network Interface function 208 may include data interfaces, operations support interfaces, radio frequency interfaces, and the like (implemented, for example, by routers, switches, modems or other network connection support devices at each network device 13, 26 and 14), configured to handle communications protocols/programs such as Ethernet; 802.11 (WiFi), Token Ring, Internet Protocol (various versions), address resolution protocol, and user datagram protocol ("UDP"), among others, and to facilitate communication between Application Layer functions such as DSG Server function 60 (shown in FIG. 1 and discussed further below), DSG Agent function 70 (also shown in FIG. 1 and discussed further below), and DSG Client function 80 (shown in FIGS. 1 and 3 and discussed further below), and Application Layer protocols, such as HTTP, SMTP, FTP, SSH, IRC, and SNMP, among others.

Referring again to FIG. 1, server 13 represents one or more co-located or remote computer systems that include and/or access the components of generic network device 200 (shown in FIG. 2), including Network Interface function 208. Server 13 may be implemented, for example, by a digital addressable controller (for example, Motorola's DAC 6000) and/or a remote addressable download server (such as Motorola's RADD 6000 or Carousel Server 1000).

DSG Server function 60 represents aspects of the functional arrangement of various computer programs 206 (shown in FIG. 2; DSG Server function 60 is preferably implemented by one or more Application Layer computer programs 206) that pertain to the creation and forwarding of OOB Messages 50 by server 13. DSG Server function 60 creates, at the Transport Layer, user datagram protocol ("UDP") datagrams containing certain OOB Messages 50 that are used by Application Layer programs in consumer network device 14, such as DSG Client function 80 (discussed further below).

CMTS 26 manages communications with cable modem 15 within consumer network device 14, providing, among other things, a downstream transport for OOB Messages 50 over OOB Channel 17. In accordance with the DSG Specification, CMTS 26 encapsulates IP datagrams received from packet-switched Regional IP Network/IP Backbone 24 into DOCSIS physical data units ("PDUs"), using a destination address that is uniquely associated with DSG Tunnel 18, and forwards them to cable modem 15.

CMTS 26 includes and/or accesses the components of generic network device 200 (shown in FIG. 2), including Network Interface function 208. CMTS may be implemented, for example, by Motorola's BSR-64000 (Broadband Services Router.

DSG Agent function 70 represents aspects of the functional arrangement of various computer programs 206 (shown in FIG. 2; DSG Agent function 70 is preferably implemented by one or more Application Layer computer programs 206) that pertain to the forwarding of OOB Messages 50 by CMTS 26 to consumer network device 14. DSG Agent function 70 includes an implementation of the DSG Protocol/functionality referred to in the DSG Specification as the DSG Agent, which (1) creates DSG Tunnel 18, (2) places a stream of OOB Messages 50 from server 13 into DSG Tunnel 18, and (3) sends DSG Tunnel 18 to DSG Client 80 (discussed further below).

Figure 3:
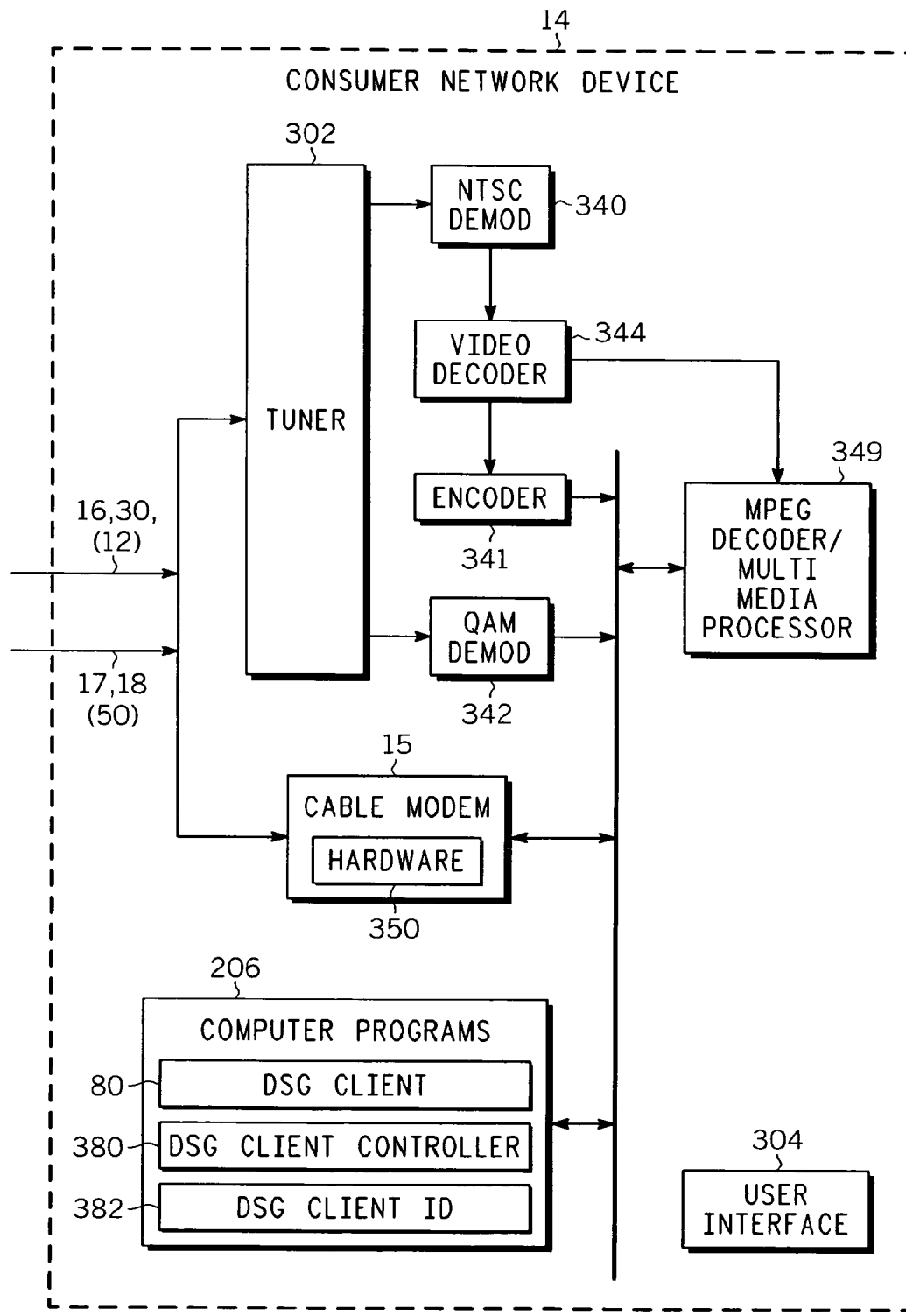
FIG. 3 is a block diagram of the consumer network device shown in FIG. 1, in which various aspects of the present invention may be used.
Figure 4:
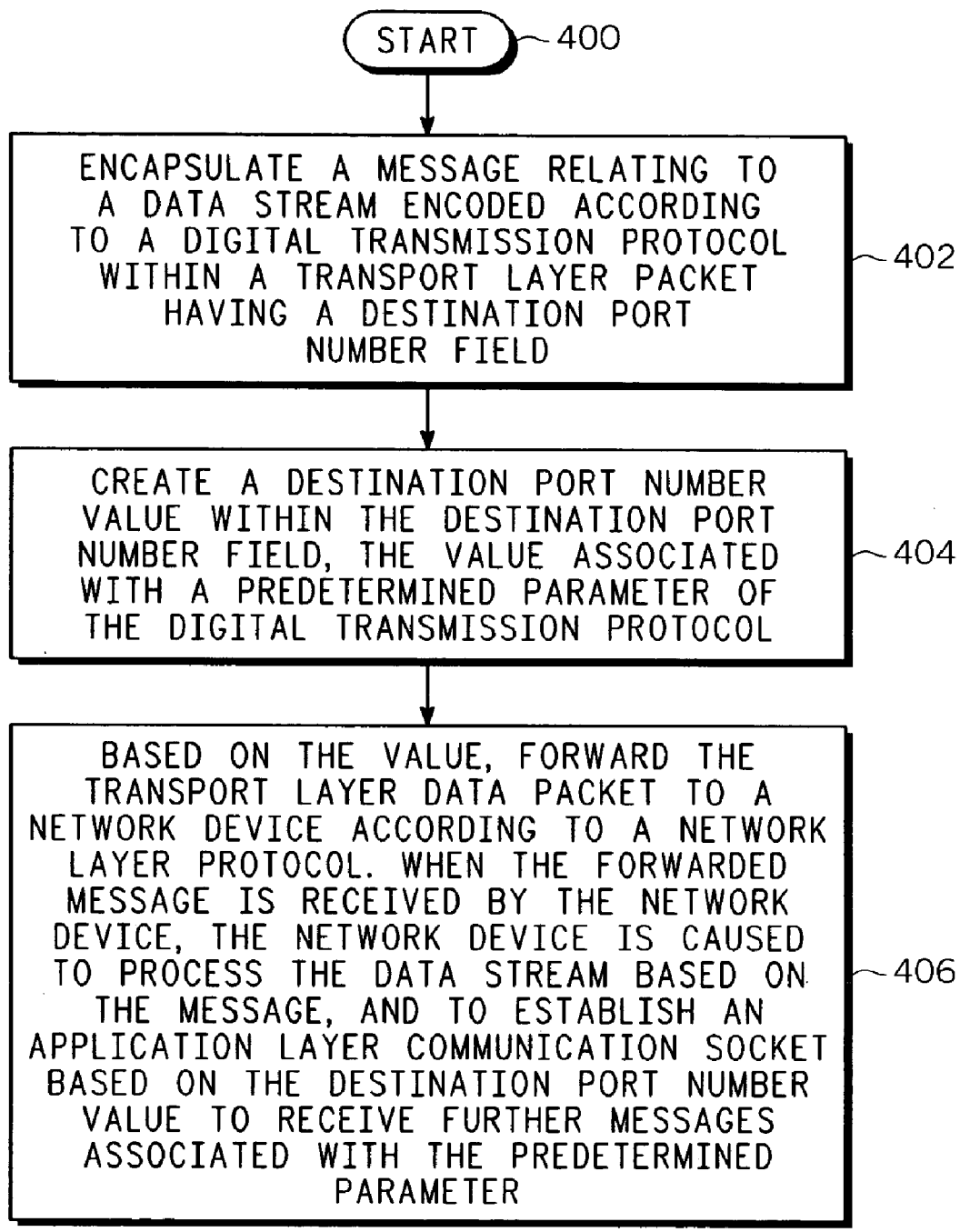
FIG. 4 is a flowchart of a method for managing a data stream encoded according to a digital transmission protocol, in accordance with certain aspects of the present invention.

FIG. 3 is a block diagram of consumer network device 14, in which various aspects of the present invention may be used. Consumer network device 14 receives channels 16 and 17 from HFC Network 25 (shown in FIG. 1). Consumer network device 14 is initially responsible for selecting a downstream DOCSIS® OOB Channel 17 that contains DSG Tunnel 18—for example, a downstream channel associated with a particular vendor, such as Motorola, may be selected. Based on information within OOB Messages 50 received by consumer network device 14 via OOB Channel 17 over DSG Tunnel 18 regarding the organization of content 12 within data streams 30 transmitted over in-band channels 16, consumer network device 14 reconstructs content 12 into a format that may be displayed to a user of consumer network device 14.

Internally, consumer network device 14 includes an in-band tuner 302, which tunes to a channel signal selected by a consumer (not shown) via user interface 304. User interface 304 may be any type of known or future device or technology, such as a remote control, mouse, microphone, keyboard, or display.

NTSC Demodulator 340 and QAM Demodulator 342 are responsive to in-band tuner 302. NTSC Demodulator 340 includes components responsive to receive analog versions of a channel signal.

A digital demodulator 342, which as shown is a QAM Demodulator, but, which may be any type of digital demodulator device, such as a DigiCipherII demodulation device, includes components responsive to receive digital versions of a channel signal, and to output video information. QAM Demodulator 342 receives and processes digital data packets from one or more digital sources, such as a digital television signal, an MPEG transport stream, or a media stream from an external network connection, such as cable modem 15, using well-known methods and techniques.

Video decoder 344 is responsive to receive and decode video information. Video information that may require format translation or modification for compatibility with capabilities of consumer network device 14 may be passed to encoder 341 for formatting. Video information that is in a format preferred for use by MPEG Decoder/Multi Media Processor 349 may be passed directly to MPEG Decoder/Multi Media Processor 349.

Encoder 341 is operative to perform predetermined coding techniques (for example, MPEG-2, MPEG-4, and others) to produce an encoded video signal for transmission to MPEG Decoder/Multi Media Processor 349, or for storage.

MPEG Decoder/Multi-Media Processor 349 is operative to perform predetermined coding techniques to arrange video information into displayable formats, in accordance with well-known methods and techniques. Internal arrangements of MPEG Decoder/Multi-Media Processor 349 are well known, and may include analog-to-digital converters, one or more storage media and/or buffers, and general or special-purpose processors or application-specific integrated circuits, along with demultiplexors for demultiplexing and/or synchronizing at least two transport streams (for example, video and audio).

Cable modem 15 is a DOCSIS®-compliant cable modem that includes DSG Protocol functionality for converting signals received over OOB Channel 17 into data packets for receipt by consumer network device 14 (or other attached user devices, such as personal computers, data terminal equipment, telephones, media players, networked consumer appliances, or any other IP-enabled device or component thereof.) Cable modem 15 includes hardware filters 350 (discussed further below), which are packet filters used to qualify/add access control to the packets received in DSG Tunnel 18.

Consumer network device 14 also includes and/or accesses the components of generic network device 200 (shown in FIG. 2), including Network Interface function 208.

DSG Client function 80 represents aspects of the functional arrangement of various computer programs 206 (shown in FIG. 2; DSG Client function 80 is preferably implemented by one or more Application Layer computer programs 206) that pertain to the receipt and processing of OOB Messages 50 by consumer network device 14 and/or cable modem 15. DSG Client function 80 includes an implementation of the DSG Protocol/functionality referred to in the DSG Specification as the DSG Client, which terminates DSG Tunnel 18 and receives content from server 13. Multiple DSG Clients may exist within consumer network device 14, and a DSG Client ID 382 uniquely identifies each DSG Client, as further set forth in the DSG Specification.

DSG Client Controller function 380 represents aspects of the functional arrangement of various computer programs 206 (shown in FIG. 2; DSG Client Controller function may be implemented at least in part by one or more Application Layer computer programs 206), hardware, and/or firmware that handles the processing of DCD Messages (as defined in the DSG Specification) and makes decisions regarding the forwarding of DSG Tunnel 18 within consumer network device 14.

Consumer network device 14 may also include additional interfaces for communication with external devices, such as interfaces supporting modems using communication protocols and techniques other than DOCSIS®, streaming media players, and other network support devices and/or software.

With continued reference to FIGS. 1-3, FIG. 4 is a flow-chart of a method for managing a data stream encoded according to a digital transmission protocol, in accordance with certain aspects of the present invention. The method may be implemented when one or more computer programs, such as computer programs 206 associated with headend 22 (for example, computer programs associated with server 13), are loaded into a processor and executed.

The data stream is configured for broadcasting to a consumer network device, such as consumer network device 14, within a broadband communications network, such as system 10. The data stream may be, for example, data stream 30 containing content 12, which is encoded in accordance with an MPEG digital transmission protocol, such as MPEG-2, and/or other digital transmission protocols, such as proprietary protocols based on MPEG (for example, DigiCipherII).

The method begins at block 400, and continues at block 402, where a message (such as OOB Message 50) relating to the data stream is encapsulated within a transport layer data packet, such as a UDP datagram (discussed further below). The transport layer data packet has a destination port number field associated therewith. A destination port number value, which is associated with a predetermined parameter of the digital transmission protocol, is created within the destination port number field, at block 404.

The message contains information usable by the consumer network device to access certain content within the data stream, and/or for general operational control of the consumer network device. Such information may include, for example (i) MPEG-defined information such as: a Program Association Table ("PAT"); a Program Map Table ("PMT"); and other MPEG-defined information and/or (ii) operator/vendor-defined information such as: a Conditional Access Table ("CAT"); an entitlement management message; and instructions/values generally sent using vendor-defined addressing techniques, such as DigiCipherII's unicast addressing technique and DigiCipherII's multicast addressing technique.

Figure 5:
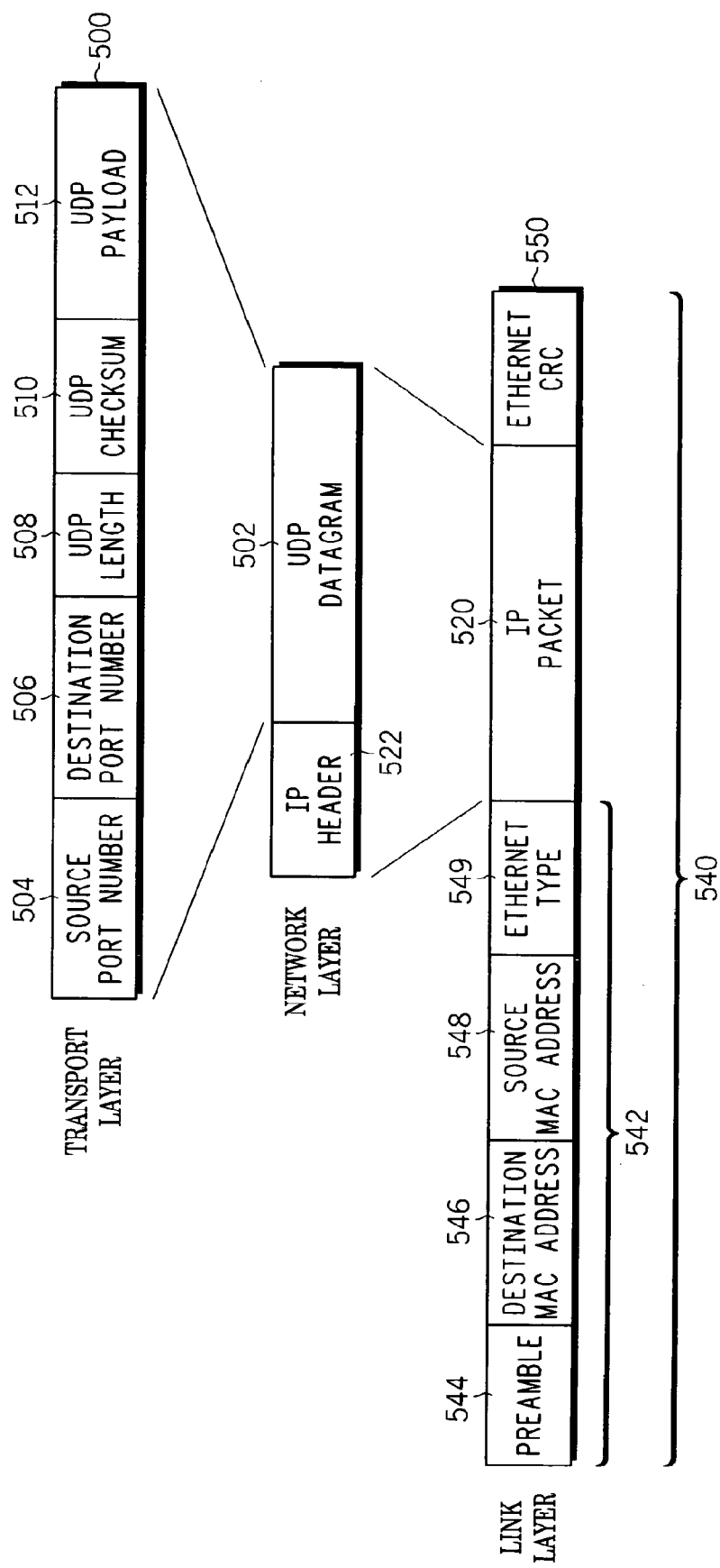
FIG. 5 is a block diagram of an encapsulation scheme for a message transmitted between network devices in the system shown in FIG. 1, in accordance with certain aspects of the present invention.

FIG. 5 is a block diagram of one possible encapsulation scheme for the message, which may be created by DSG Server function 80 in accordance with certain aspects of the present invention. As shown at the Transport Layer of FIG. 5, UDP datagram 502 includes the following fields: a sixteen-bit source port number 504; a sixteen-bit destination port number 506; a message length indicator 508; a checksum value 510; and a UDP payload field 512, which contains the content of the message.

Destination port number 506 is used identify the content of the message (as permitted by DSG Advanced Mode, set forth in the DSG Specification), by creating a destination port number value that is a logical reference to a predetermined parameter associated with the digital transmission protocol. The destination port number values discussed herein are preferably within the range(s) of destination port number values indicated for private use (the "Private Port Range") by IANA (Internet Assigned Numbers Authority).

In one example, a particular area of the Private Port Range is used to provide logical references to MPEG-defined and operator/vendor-defined parameters, such as Program Identifiers ("PIDs"), which are used to convey MPEG-defined information and operator/vendor-defined information usable by consumer device 14 to access certain content 12 within data stream 30.

An area of the Private Port Range (the "PID Mapping Range") beginning at destination port number value 49,152 may be established by setting the first three bits of sixteen-bit destination port number 506 to "110". When "110" appears in the first three bits of destination port number 506, it indicates that a logical reference to a PID is contained in the subsequent 13 bits of the destination port number. The subsequent 13 bits of sixteen-bit destination port number 506 may then be used to represent PIDs in the range of 0-8191. Thus, the possible values of destination port number 506 in the PID Mapping Range would be from 49,152-57,343. PID 0, for example, would be represented by 1100000000000000, and PID 8096 would be represented by 1101111110100000.

In another example, a particular area of the Private Port Range is used to provide logical references to operator/vendor-defined parameters, such as certain unicast and multicast addressing protocols, that are used to convey operator/vendor-defined information usable by consumer device 14 for general operational control.

An area of the Private Port Range (the "Unicast Addressing Range") beginning at destination port number value 57,344 may be established by setting the first four bits of destination port number 506 to "1110". When "1110" appears in the first four bits of destination port number 506, it indicates that a logical reference to a unicast addressing protocol is contained in the subsequent 12 bits of the destination port number. The subsequent 12 bits of sixteen-bit destination port number 506 may then be used to represent unicast addresses (for example, the last 12 bits of the unit address or MAC address (not including the check sum) of the consumer network device). Possible values of destination port number 506 in the Unicast Addressing Range would be from 57,344-61,439. The Unicast Addressing Range will potentially apply to a relatively small number of consumer network devices, and further filtering may need to be performed to derive the applicability of the message. For example, the message may include the specific 40-bit address of the intended consumer network device, and be examined to determine the applicability of the message. The full population of unit-addressed messages is divided by 4,096, however, so that a population of 200,000 consumer network devices would be divided into groups of roughly fifty devices each (assuming a perfect distribution of the least significant 12 bits of the unit address). In operations that require many unicast messages, such as set-top population refresh operations, with a random distribution of the least significant 12 bits of unit addresses, this represents a 99.9% reduction in unicast messages versus methods set forth in the DSG Specification.

An area of the Private Port Range (the "Multicast Addressing Range") beginning at destination port number value 61,440 may be established by setting the first four bits of destination port number 506 to "1111". When "1111" appears in the first four bits of destination port number 506, it indicates that a logical reference to a multicast addressing protocol is contained in the subsequent 12 bits of the destination port number. The subsequent 12 bits of sixteen-bit destination port number 506 may then be used to represent multicast addresses (for example, the legacy CableCard design includes a well-known M16 address value for providing the Source Name Table. This table is required by CableCards but not by set-tops, and set-tops may ignore such references). Possible values of destination port number 506 in the Multicast Addressing Range would be from 61,440-65,535.

At block 406, based on the destination port number value, the transport layer data packet is forwarded to the network device according to a network layer protocol. When the forwarded message is received by the consumer network device, the consumer network device is caused to process the data stream based on the message, and to establish an application layer communication socket based on the destination port number value. The application layer communication socket is usable to receive further messages associated with the predetermined parameter of the digital transmission protocol.

Referring again to FIG. 5, DSG Server 80 multiplexes UDP datagrams 502 into a Network Layer stream of IP packets 520 that encapsulate UDP datagrams 502. An IP packet 520 includes an IP header 522, which further includes elements (not shown) such as a 32-bit source IP address (the IP address of the sender of the IP packet), a 32-bit destination IP address (the IP address of the intended receiver(s) of the IP packet), and indications of the transport protocol (e.g., UDP) of the encapsulated datagram.

IP packets 520 are further encapsulated for transmission to DSG Agent 70 within CMTS 26 via Regional IP Network/IP Backbone 24 using a Data Link Layer interface such as the Ethernet. An Ethernet frame 540 includes: a header 542, which typically further includes an eight-octet preamble 544, a six-octet destination Media Access Control ("MAC") address 546, a six-octet source MAC address 548, and a two-octet Ethertype 549 (indicating what sort of data is held in the frame—IP packets are represented by hexadecimal value 0800H); a variable-length IP packet 520; and a four-octet Ethernet cyclic redundancy check (CRC) 550. Packets from a particular IP stream may be addressed from one source MAC address, such as the MAC address of server 13, and delivered to one destination MAC address, such as the MAC address of CMTS 26.

The Ethernet frames are modulated onto a carrier (not shown) for transmission across a physical medium to CMTS 26.

When IP packets 520 are received by CMTS 26, DSG Agent function 70 operates to examine and re-encapsulate IP packets 520 into DOCSIS® PDUs, using a destination MAC address that is uniquely associated with DSG Tunnel 18 (replacing the original destination MAC address with the DSG Tunnel address, and the original source MAC address with the CMTS MAC address), and forwards them to cable modem 15 via OOB Channel 17, all in accordance with methods and techniques set forth in portions of the DSG Specification applicable to the DSG Advanced Mode, which is defined therein.

In general, DSG Agent function 70 implements Network Layer and Transport Layer filtering to determine what traffic to place on DSG Tunnel 18. For example, DSG Agent function 70 may examine UDP destination port numbers 506 of incoming IP packets, consult a set of classification criteria associated with DSG Tunnel 18, and only place those packets having UDP destination port numbers 506 with prefixes of "110," "1110," or "1111" onto DSG Tunnel 18. In this manner, IP packets associated with DSG Tunnel 18 may be delivered to ports within the PID Mapping Range, the Unicast Port Range, and/or the Multicast Port Range. DSG Agent function 70 may also transmit the set of classification criteria to consumer network device 14, for use in demultiplexing the IP stream on DSG Tunnel 18, and may further associate a particular DSG Client ID 382 with a particular destination port number value (or range of values).

At consumer network device 14, DSG Client Controller 380 hunts for a DOCSIS® downstream channel with a valid DSG Tunnel identifier. When DSG Tunnel 18 is identified (based on the use of a well-known MAC address, as defined in the DSG Specification) and received by consumer network device 14, DSG Client Controller 380 may use DSG Client ID 382 to demultiplex the IP stream on DSG Tunnel 18 based on the set of classification criteria it received from DSG Agent function 70/CMTS 26, and to forward contents of DSG Tunnel 18 to DSG Client function 80, as appropriate. It will be appreciated that prefixes of UDP datagrams 502 that are configured in accordance with aspects of the present invention may be filtered using software and/or using hardware in cable modem 15 (such as hardware filter 350), which would pass filtered packets to Application Layer programs of DSG Client function 80. Such Application Layer programs would in turn use the IP address associated with DSG Tunnel 18, together with ports identified by destination port number values within destination port numbers 506, to establish sockets for communication of messages having content that is associated with parameters represented by the destination port number values. The messages would be used by the consumer network device to process the data stream, among other things.

For example, the MPEG-defined PID 0 parameter identifies the PAT, which is broadcast on PID 0 in the transport stream. The message portion of the UDP datagram that contains the destination port number value logically referring to PID 0 in accordance with aspects of the present invention (i.e., destination port number value 49,152) would therefore contain the PAT, and a socket connection could be created and bound to destination port number value 49,152.

Likewise, in accordance with the DigiCipher II protocol, the PID 1 parameter identifies the CAT, which is broadcast on PID 1 in the transport stream. The message portion of the UDP datagram that contains the destination port number value logically referring to PID 1 in accordance with aspects of the present invention (i.e., destination port number value 49,153) would therefore contain the CAT, and a socket connection could be created and bound to destination port number value 49,143.

Further sockets to destination port number values within the PID Mapping Range could be created in a similar manner—for example, various PID values referred to by the PAT and/or the CAT (for example, those identifying PMTs, network messages, or Entitlement Management Messages) could be used to determine destination port number values and sockets to be established.

Still further sockets may be created to destination port number values within the Unicast and Multicast Address Ranges, using well-known unit address values, or values as required by other messaging.

Figure 6:
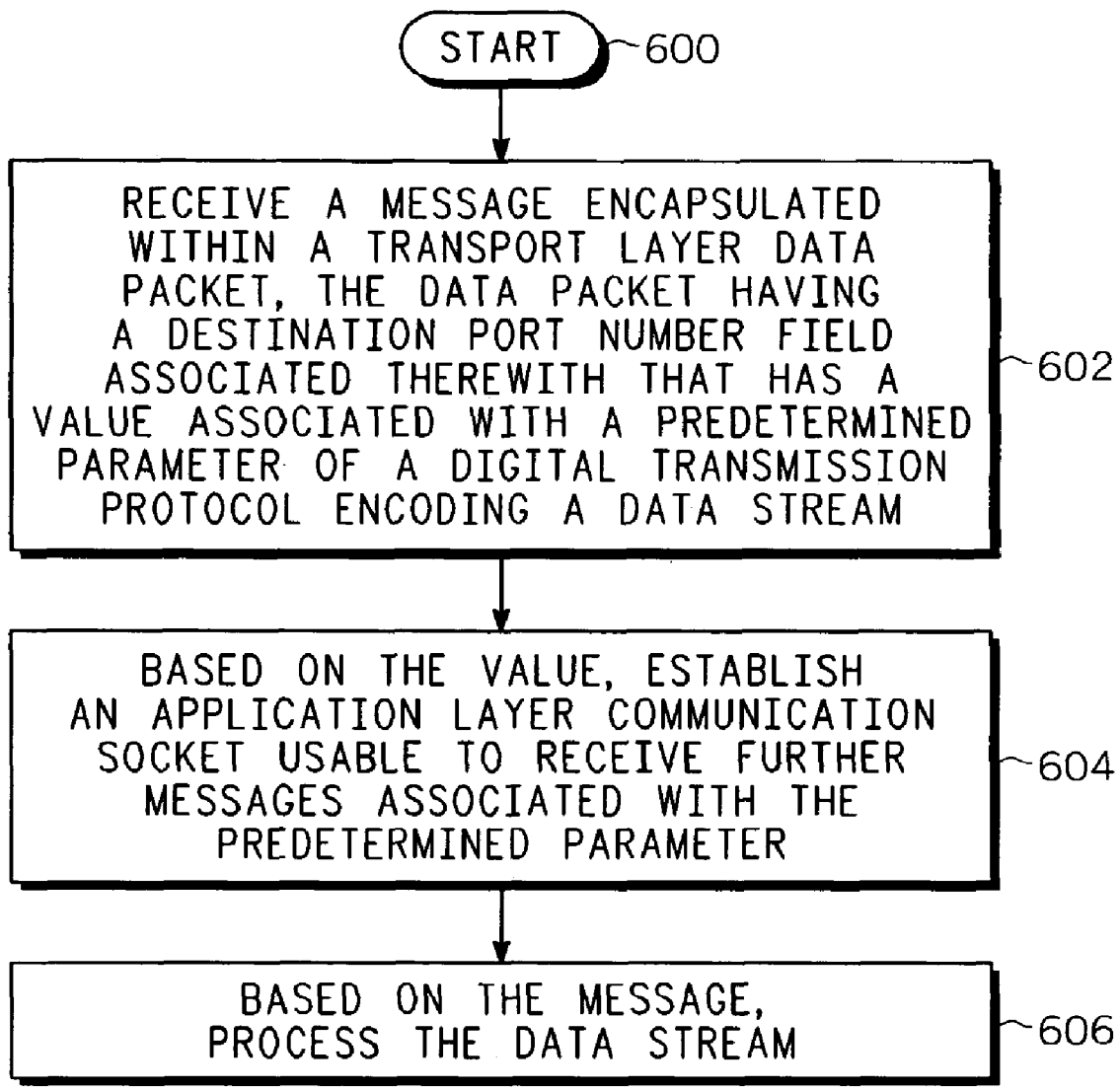
FIG. 6 is a flowchart of a method for managing a data stream encoded according to a digital transmission protocol, in accordance with further aspects of the present invention.

FIG. 6 is a flowchart of a method for managing a data stream encoded according to a digital transmission protocol, in accordance with further aspects of the present invention.

The method may be implemented when one or more computer programs, such as computer programs 206 associated with computer network device 14, are loaded into a processor and executed.

The data stream is configured for broadcasting to a consumer network device, such as consumer network device 14, within a broadband communications network, such as system 10. The method begins 600, and continues at block 602, where a message encapsulated within a transport layer data packet is received. The transport layer data packet has a destination port number field associated therewith, which has a value therein associated with a predetermined parameter of the digital transmission protocol.

At block 604, based on the destination port number value, an application layer communication socket is established. The application layer communication socket is usable to receive further messages associated with the predetermined parameter of the digital transmission protocol. The data stream is processed based on the message, at block 606.

Aspects of the present invention described herein address the need for methods and apparatuses for managing encoded data streams configured for broadcasting to consumer network devices within broadband communication systems using packet-based network protocol messaging for out-of-band communication with the consumer network devices, while also allowing the consumer network devices to efficiently receive and process relevant messages based on predetermined parameters of the encoding protocol. Aspects of the present invention are applicable to the mapping of constructs of proprietary/MPEG-based encoding schemes such as DigiCipherII to constructs of IP networks, but it will be appreciated that destination port mapping of encoding constructs may be used in any IP environment/addressing construct, including direct IP addressability of network devices such as set-tops, and mapping of the constructs of encoding schemes such as ATM Virtual Path and Virtual Channel Identifiers to constructs of IP networks. It will also be appreciated that aspects of the present invention are not limited to messaging for out-of-band communications, and may be applicable to control, video, audio and voice data streams in general.

It will also be appreciated that aspects of the present invention are not limited to any specific embodiments of computer software or signal processing methods. For example, one or more processors packaged together or with other elements of headend 22 or consumer network device 14 may implement functions described herein in a variety of ways. Computer programs implementing functions described herein or parts thereof may be stored in computer-readable memories, and implemented according to well-known software engineering practices for component-based software development. It will be understood, however, that the functions described herein are processes that convey or transform data in a predictable way, and may generally be implemented in hardware, software, firmware, or any combination thereof.

When one element is indicated as being responsive to another element, the elements may be directly or indirectly coupled. Connections depicted herein may be logical or physical in practice to achieve a coupling or communicative interface between elements. Connections may be implemented as inter-process communications among software processes.

It will furthermore be apparent that other and further forms of the invention, and embodiments other than the specific embodiments described above, may be devised without departing from the spirit and scope of the appended claims and their equivalents, and it is therefore intended that the scope of this invention will only be governed by the following claims and their equivalents.

The invention claimed is:

1. A method for managing a data stream encoded according to a digital transmission protocol and configured for broadcasting to a consumer network device within a broadband communications network, the method comprising:
   receiving a message encapsulated within a transport layer data packet, the transport layer data packet having a destination port number field associated therewith, the destination port number field having a destination port number value therein associated with a predetermined parameter of the digital transmission protocol;
   based on the destination port number value, establishing an application layer communication socket, the application layer communication socket usable to receive further messages associated with the predetermined parameter of the digital transmission protocol; and
   based on the message, processing the data stream,
   wherein the destination port number value is within a predetermined private port range,
   wherein the predetermined private port range is determined by a prefix of the destination port number value,
   wherein the prefix comprises a first three bits of the destination port value, when the predetermined parameter comprises a MPEG program identifier ("PID") value.

2. The method according to claim 1, further comprising:
   using filters associated with the consumer network device to discriminate the destination port number field.

3. The method according to claim 2, wherein the filters comprise hardware filters.

4. The method according to claim 2, wherein the filters comprise software filters.

5. A non-transitory computer-readable medium encoded with a computer program which, when loaded into a processor, implements the method of claim 1.

6. An apparatus for managing a data stream encoded according to a digital transmission protocol and configured for broadcasting to a consumer network device within a broadband communications network, the apparatus comprising:
   an interface operative to process a plurality of transport layer data packets;
   a non-transitory computer-readable storage medium; and
   a processor responsive to the computer-readable storage medium and to a computer program, the computer program, when loaded into the processor, operative to:
      arrange for receipt of a message encapsulated within a transport layer data packet, the transport layer data packet having a destination port number field associated therewith, the destination port number field having a destination port number value therein associated with a predetermined parameter of the digital transmission protocol; and
   based on the destination port number value, arrange for establishment of an application layer communication socket, the application layer communication socket usable to receive further messages associated with the predetermined parameter of the digital transmission protocol, the data stream arranged for processing based on the message,
   wherein the destination port number value is within a predetermined private port range,
   wherein the predetermined private port range is determined by a prefix of the destination port number value,
      wherein the prefix comprises a first three bits of the destination port value, when the predetermined parameter comprises a MPEG program identifier ("PID") value.

7. The apparatus according to claim 6, wherein the processor is associated with a server.

8. The apparatus according to claim 6, wherein the processor is associated with a consumer network device.

9. The apparatus according to claim 8, wherein the consumer network device comprises a set-top box.

* * * * *